Patented Oct. 30, 1945

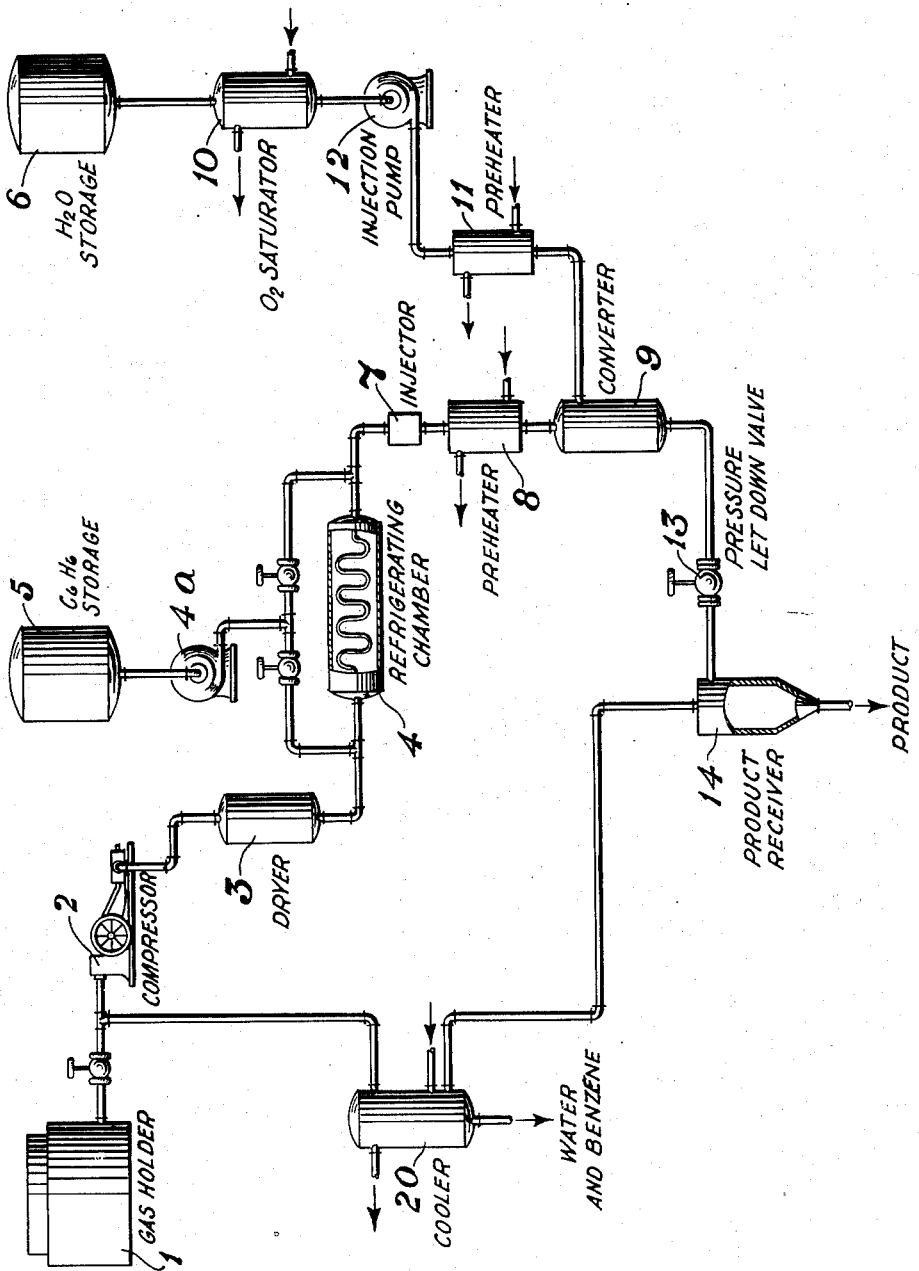

2,388,138

UNITED STATES PATENT OFFICE 2,388,138

PROCESS FOR THE PREPARATION OF ETHYLENE POLYMERS

Crawford Hallock Greenewalt, Greenville, Del., assignor to E. I. du Pont de Nemours & Company, Wilmington, Del., a corporation of Delaware Application January 29, 1943, Serial No. 473,938

6 Claims. (Cl. 260—94)

This invention relates to an improved process for the polymerization of hydrocarbons containing a single ethylenic linkage and is more particularly related to an improved process for the polymerization of ethylene to products of relatively high molecular weight.

Various methods have been proposed for the polymerization of olefines such as ethylene with the principal object of obtaining high molecular weight products for various purposes. Oil-like products of relatively low molecular weight have been prepared from ethylene by its polymerization in the presence of boron fluoride and like catalysts while solid to semi-solid high molecular weight products of a polymeric nature have been obtained by effecting the polymerization in the absence of catalysts or in the presence of peroxygen-type catalysts by treatment at pressures above 50 atmospheres and up to 3,000 atmospheres or more. The invention of the instant case is principally directed toward products of the latter type.

An object of the present invention is to provide an improved process for the polymerization of hydrocarbons containing an ethylenic linkage. Another object is to provide a process for the preparation of high molecular weight products from ethylene wherein the ethylene is brought to reaction pressure in two pressure steps. A further object is to provide an improved process for the preparation of polymers of ethylene wherein the ethylene is compressed, liquefied at relatively low pressures and the liquid ethylene subsequently raised to polymerization pressures. Other objects and advantages of the invention will hereinafter appear.

In the preparation of high molecular weight polymers of olefinic hydrocarbons containing an ethylenic linkage and more especially in the polymerization of ethylene per se and the preparation of high molecular weight polymers of ethylene with other organic compounds, in the presence of peroxygen-type catalysts or if very high pressures are used in the absence of added catalysts, the reaction is conducted under superatmospheric pressures. In accord with the invention it has been found that the ethylene or other olefinic hydrocarbons can be efficiently and economically brought to reaction pressure by first compressing the gas to approximately its critical pressure, and for ethylene preferably to a pressure between 20 and 150 atmospheres, subsequently cooling the thus compressed gases to a temperature sufficient to liquefy them, that is, for ethylene, to a temperature between −35 and +5° C., thereby converting the gas to a liquid, and thereafter raising the pressure of the resulting liquid to the desired reaction pressure.

By carrying out the compression in accord with the above general procedure and by the use of available compression means, valuable products are obtained uncontaminated with foreign substances which may be introduced into the olefines unless the indicated procedure is followed. It has been found that ethylene under pressure is a solvent for mineral and vegetable lubricating oils and consequently when the vapors of ethylene and like olefines are compressed they pick up the lubricants employed in the compressors and carry these lubricants into the product. This contamination should be avoided inasmuch as high molecular weight products and polymers of ethylene containing these lubricants are not as valuable or as useful as similar products obtained in pure form.

By the pressure cycle of the present invention, it is possible to carry on the first step of compression in a compressor lubricated with mineral or vegetable oil inasmuch as at the comparatively low pressures of this step, i. e. up to about 150 atmospheres, the olefine will not pick up undesirable quantities of the lubricant. After refrigeration to a liquid, the liquefied olefines may then be raised to the high reaction pressure in a liquid injection pump (wherein contact with the lubricant is slight), or in any other suitable pump in which contact of the olefine with the lubricant is limited.

The invention will be more easily understood by reference to the attached diagrammatic drawing, wherein ethylene from gas holder 1 is drawn through an oil lubricated compressor 2 and its pressure increased to from 20 to 150 atmospheres. Inasmuch as ethylene will contain some moisture, it is passed through a drier 3, containing calcium chloride, solid NaOH or other suitable drying medium, for the removal of the moisture and is then passed into a refrigerating chamber 4 wherein it is condensed to a liquid. Prior to or subsequent to its passage into the refrigerating chamber 4, benzene or other suitable addition agent such as isooctane, chlorobenzene, etc., or a reactant such as vinyl acetate, vinyl chloracetate, methyl methacrylate, etc., may be introduced, by means of the injector 4a from storage tank 5 into the ethylene. Benzene may be introduced at a rate of approximately 0.05 to 2.0 parts thereof per part of the ethylene, other addition agents being introduced in suitably controlled amounts. The resulting liquid mixture is then raised in the injector 7 to the pressure of polymerization preferably between 800 to 1500 atmospheres although much higher pressures may be used. The resulting mixture is then heated to the desired reaction temperature, in preheater 8, i. e. for example, between approximately 50° and 400° C. after which the compressed reaction mixture is introduced directly into the converter 9. Into converter 9 there is likewise injected 0.1 to 10.0 parts of water per part of the ethylene, the water being transferred from the storage tank 6 to the oxygen saturator 10, is heated in preheater 11 and forced into the converter 9 by means of the injection pump 12. The total oxygen at this point should be equivalent preferably to about 20 to about 2000 P. P. M. of the ethylene present. The products issuing from the converter pass through a pressure let-down valve 13 from which they are introduced into the product receiver 14. The solid products are discharged from the bottom of the product receiver 14. The vapors from the top of receiver 14 are returned to the ethylene stream after cooling in cooler 20 to approximately inlet ethylene temperature, condensed water and benzene being separated from the olefine in cooler 20. The cooled ethylene is then returned to the synthesis with the make-up ethylene stream.

The reaction as broadly described above may be carried out in accord with the invention in any suitable type of converter capable of withstanding the high pressures and it is preferably conducted in one having relatively great length to cross section. The converter may be made of high chromium, low nickel steel such as 18% chromium 8% nickel or may be made of alloy steel or mild steel lined with a chrome-steel or other suitable metal such as silver, or with other corrosion resisting liners of chromium, porcelain, etc.

The peroxygen-type catalyst which may be employed with the reaction includes molecular oxygen or air which may be present with respect to the olefine in amounts ranging from 5 to 2,000 P. P. M. (calculated as oxygen). While oxygen is the preferred catalyst other peroxygen-type catalysts may be used, such catalysts including dialkyl dioxides (such as diethyl peroxide), hydrogen peroxide, persuccinic acid, lauroyl peroxide, tetralin peroxide, urea peroxide, butyryl peroxide, benzoyl peroxide, alkali metal and alkaline earth metal and ammonium persulfates, perborates, percarbonates and the like. The amount of peroxide catalysts used may vary over a wide range from 0.1 to 5% by weight based on the ethylene or higher.

The reaction as has been stated may be conducted with any polymerizable aliphatic monoolefinic hydrocarbon by which is meant one that can be converted to a polymer in the presence of the aforesaid and like catalysts under the pressure and temperature conditions designated. Ethylene, propylene and isobutylene are the most prominent hydrocarbons of this class and of these the most important is ethylene.

The invention is not limited solely to the polymerization of the aforesaid hydrocarbons for it is known that ethylene can be interpolymerized with a variety of unsaturated compounds such as propylene, isobutylene, styrene, and similar monoolefinic hydrocarbons, vinyl esters, such as vinyl acetate, vinyl formate, and vinyl isobutyrates, as well as such acids as acrylic, methacrylic, itaconic, crotonic, and fumaric as well as their derivatives such as esters, acid halides, amides, and anhydrides. Ethylene will likewise form valuable interpolymers with vinyl chloride, vinylidene chloride, vinyl cyanide and N-vinyl amides, vinyl ethers, divinyl formal, divinyl butyral and methyl vinyl ketone. This olefine will likewise form high molecular weight products in the presence of and with a number of compounds such, for example, as the halogenated aliphatic hydrocarbons; saturated aliphatic or aromatic acids, esters, anhydrides, aldehydes, alcohols, ethers and so forth; and with sulfonyl halides, and sulfur halides.

I claim:

1. In a process for the polymerization of ethylene in the presence of a catalyst selected from the group consisting of oxygen and peroxy catalysts at pressures between 800 and 3000 atmospheres, the operation which comprises compressing the ethylene to between 20 and 150 atmospheres, refrigerating the ethylene under this pressure to a temperature between $-35°$ and $5°$ C., thereby condensing it to the liquid phase, and subsequently increasing the pressure, in the substantial absence of lubricating oil, of the liquid ethylene to polymerization pressures between 800 and 3000 atmospheres.

2. In a process for the preparation of solid to semi-solid polymers of ethylene in the presence of an organic peroxide catalyst at a pressure between 50 and 3000 atmospheres the operation which comprises compressing ethylene to between 20 and 150 atmospheres, refrigerating the ethylene under this pressure to condense it to a liquid phase, and subsequently increasing the pressure, in the substantial absence of lubricating oil, of the resulting liquid to polymerization pressures.

3. In a process for the preparation of solid to semi-solid polymers of ethylene in the presence of an organic peroxide catalyst at a pressure between 50 and 3000 atmospheres, the operation which comprises compressing ethylene to between 20 and 150 atmospheres, refrigerating the ethylene under this pressure to a temperature between $-25°$ C. and $+5°$ C., and subsequently increasing the pressure, in the substantial absence of lubricating oil, of the resulting liquid to polymerization pressure between 800 and 3000 atmospheres.

4. In a process for the preparation of solid polymers of ethylene in the presence of an organic peroxide catalyst and under pressures between 50 and 3000 atmospheres, the operation which comprises compressing ethylene to between 20 and 150 atmospheres, refrigerating the ethylene under this pressure to a temperature between $-25°$ C. and $+5°$ C., compressing benzene to substantially the liquefied ethylene pressure, adding it to the liquefied ethylene and subsequently increasing the pressure, in the substantial absence of lubricating oil, of the benzene and liquid ethylene mixture to polymerization pressure between 50 and 3000 atmospheres.

5. In a process for the preparation of solid to semi-solid polymers of ethylene in the presence of an organic peroxide catalyst at pressures between 50 and 3000 atmospheres, the operation which comprises compressing ethylene to between 20 and 150 atmospheres, compressing benzene to substantially the same pressure, mixing the compressed ethylene and compressed benzene, refrigerating the resulting mixture to a temperature between $-25°$ C. and $+5°$ C. and subsequently increasing the pressure, in the substantial absence of lubricating oil, of the refrigerated mixture to polymerization pressures between 50 and 3000 atmospheres.

6. In a process for the preparation of solid to semi-solid polymers of ethylene in the presence of an organic peroxide catalyst at pressures between 50 and 3000 atmospheres, the operation which comprises compressing ethylene to between 20 and 150 atmospheres, refrigerating the ethylene under this pressure to a temperature between −25° C. and +5° C., introducing benzene into the liquid ethylene, increasing the pressure, in the substantial absence of lubricating oil, of the benzene and liquid ethylene mixtures to polymerization pressure between 50 and 3000 atmospheres, admixing the organic peroxide catalyst with the compressed mixture, effecting the polymerization at temperatures between 50 and 400° C., dropping the pressure on the reaction mixture, separating the polymers of ethylene from the unreacted ethylene and the benzene, and thereafter separating the benzene from the ethylene and returning the ethylene to the reaction.

CRAWFORD H. GREENEWALT.